(12) United States Patent
Ryu et al.

(10) Patent No.: US 9,179,523 B1
(45) Date of Patent: Nov. 3, 2015

(54) START-UP VOLTAGE FOR SOLID-STATE LIGHTING CONTROLLER

(71) Applicant: Marvell International Ltd., Hamilton (BM)

(72) Inventors: Young Chul Ryu, Cupertino, CA (US); Jinho Choi, Saratoga, CA (US); Wanfeng Zhang, Palo Alto, CA (US); Chang Qian, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/476,992

(22) Filed: Sep. 4, 2014

Related U.S. Application Data

(60) Provisional application No. 61/875,332, filed on Sep. 9, 2013.

(51) Int. Cl.
*H05B 41/16* (2006.01)
*H05B 37/02* (2006.01)
*H05B 33/08* (2006.01)

(52) U.S. Cl.
CPC ............ *H05B 37/02* (2013.01); *H05B 33/0815* (2013.01); *Y02B 20/348* (2013.01); *Y02B 70/1433* (2013.01)

(58) Field of Classification Search
CPC ............ H05B 33/0815; H05B 41/233; Y02B 20/348; Y02B 70/1433

USPC .................................. 315/193, 197, 201, 247
See application file for complete search history.

(56) References Cited

U.S. PATENT DOCUMENTS

| | | | |
|---|---|---|---|
| 2011/0309759 A1* | 12/2011 | Shteynberg et al. | 315/201 |
| 2013/0113375 A1* | 5/2013 | Leung et al. | 315/85 |
| 2013/0181635 A1* | 7/2013 | Ling | 315/297 |

OTHER PUBLICATIONS

University of Rochester,"Lab #4: Compensated Attenuator", Feb. 27, 2012.*
Cor van Rij, "Frequency Compensated Attenuator", 2006.*

* cited by examiner

*Primary Examiner* — Minh D A
*Assistant Examiner* — Borna Alaeddini

(57) ABSTRACT

A controller, which may be a controller for solid-state lighting, includes a transformer, and a control circuit having a bias voltage input. The control circuit activates when voltage applied to the bias voltage input reaches a threshold. The transformer has a feedback output to the bias voltage input. The controller also has a bias voltage circuit including a resonant circuit providing a resonant current, and a bias capacitor charged by the resonant current, applying start-up bias voltage to the bias voltage input. The controller further has a cutoff to shut down the resonant current when the transformer feedback output is above the threshold. A method of operating the a controller includes providing a resonant current to charge a start-up bias capacitor. The method also includes automatically cutting off the resonant current when the transformer feedback output is above the threshold. This may be determined by monitoring the bias voltage input.

17 Claims, 6 Drawing Sheets

START-UP VOLTAGE FOR SOLID-STATE LIGHTING CONTROLLER

CROSS REFERENCE TO RELATED APPLICATION

This claims the benefit of commonly-assigned U.S. Provisional Patent Application No. 61/875,332, filed Sep. 9, 2013, which is hereby incorporated by reference herein in its entirety.

BACKGROUND

This disclosure relates to a method and apparatus for providing initial start-up voltage for a controller for solid-state lighting.

Solid-state lighting controllers typically involve an AC-DC switching converter such as a flyback or buck-boost AC-DC power converter. Many switching power supplies transfer energy from an auxiliary tap on the main switching transformer or coil. However, entry into the switching mode requires an initial relatively high start-up voltage (e.g., mains voltage). The high-voltage input typically continues to draw power even after start-up is complete. Moreover, components of the controller have to be engineered for high-voltage operation, which is more expensive than providing low-voltage components.

SUMMARY

A controller includes a transformer, and a control circuit having a bias voltage input, the control circuit activating when voltage applied to the bias voltage input reaches a threshold, the transformer having feedback output to the bias voltage input. The controller also has a bias voltage circuit applying start-up bias voltage to the bias voltage input. The bias voltage circuit has a resonant circuit providing a resonant current, a bias capacitor charged by the resonant current, wherein voltage on the bias capacitor is the start-up bias voltage applied to the bias voltage input, and a cutoff to shut down the resonant current when the transformer feedback output is above the threshold.

In a method of operating a controller, the controller including a transformer, and a control circuit having a bias voltage input, the control circuit activating when voltage applied to the bias voltage input reaches a threshold, the transformer having feedback output to the bias voltage input, the method includes applying start-up bias voltage to the bias voltage input, by providing a resonant current to charge a start-up bias capacitor, wherein voltage on the start-up bias capacitor is applied to the bias voltage input as the start-up bias voltage. The method also includes automatically cutting off the resonant current when the transformer feedback output is above the threshold.

In a method of operating a solid-state lighting controller, where the solid-state lighting controller includes a transformer, and a control circuit having a bias voltage input, the transformer having feedback output to the bias voltage input, the method includes applying start-up bias voltage to the bias voltage input, by providing a start-up current to charge a start-up bias capacitor, wherein voltage on the start-up bias capacitor is applied to the bias voltage input as the start-up bias voltage. The method also includes monitoring, by the solid state lighting controller, voltage at the bias voltage input, and activating, by the solid state lighting controller, of a driving signal when the voltage at the bias voltage input reaches a threshold, whereby current flows in the transformer, including in the transformer feedback output, to charge an operating mode bias capacitor, thereby generating an operating mode bias voltage.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

According to this disclosure, start-up voltage for a controller for solid-state lighting (SSL) can be generated by charging up a capacitor using an extension of an L-C damping circuit that may already be present in the lighting controller circuit.

An SSL controller may be adapted from a conventional switching mode power supply. Many topologies of switching power supplies transfer energy from an auxiliary tap on the main switching transformer or coil. Because SSL devices may be used as a replacement for incandescent lamps, it would be desirable for the SSL controller to be compatible with incandescent lighting controls, including triac/thyristor dimmers. The common triac/thyristor dimmer works well with incandescent lamps. The dimmer turns on abruptly when it is triggered, and the dimmer turns off near the zero-voltage crossing when current falls below the holding current. For SSL applications, the switching mode power supply requires an initial high voltage at start-up.

Figure 1:
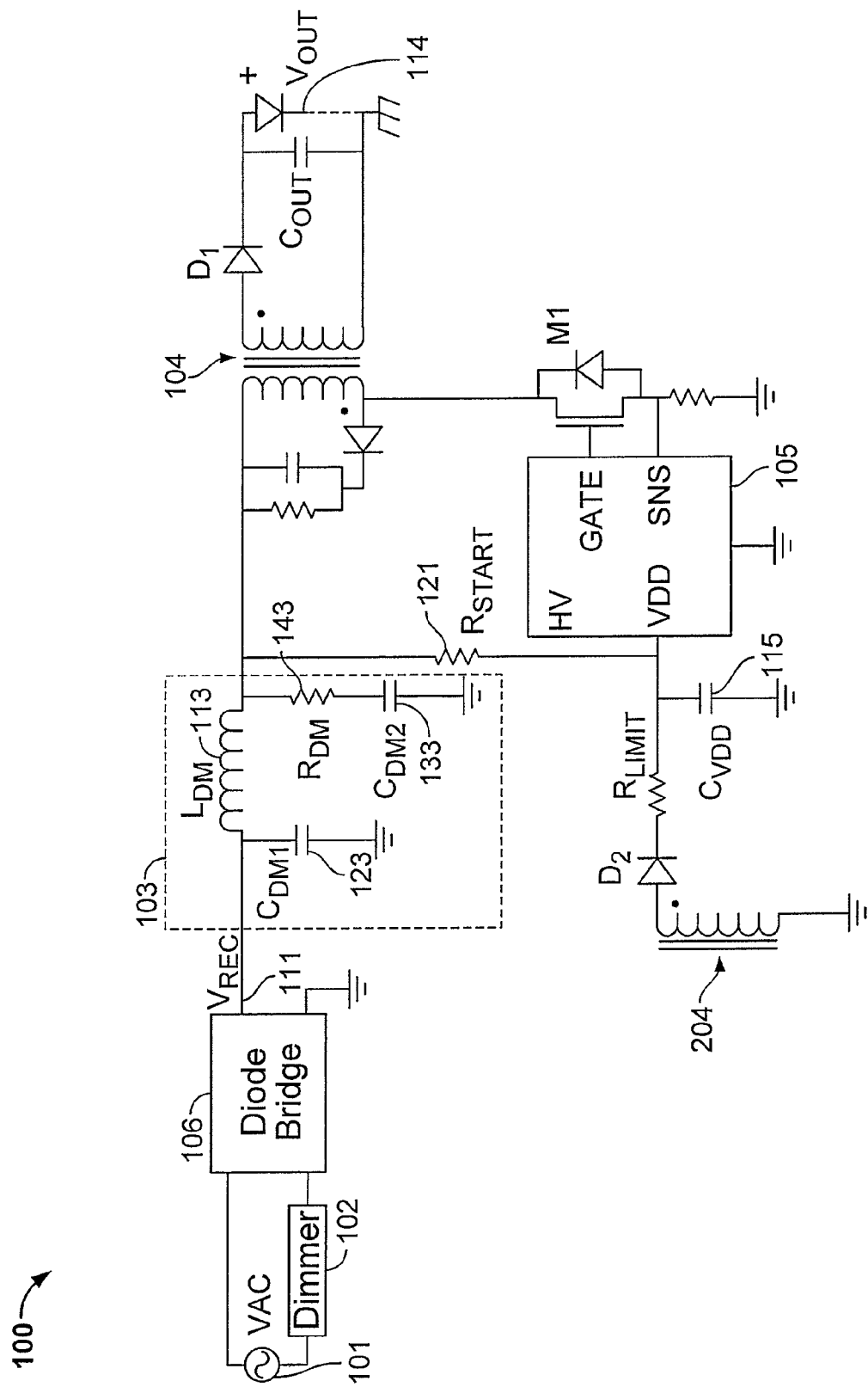
FIG. 1 shows a known switching mode power supply circuit used as an SSL controller.

FIG. 1 shows a known switching mode power supply circuit 100 used as an SSL controller. Alternating-current power source 101 may be a mains voltage power source. Dimmer 102 is optional and may be a known triac/thyristor dimmer. Transformer 104 provides output voltage $V_{out}$ (114) once control circuit 105 is triggered when the voltage on capacitor $C_{VDD}$ (115) reaches a predetermined threshold voltage.

Diode bridge 106 operates as a full wave rectifier, converting alternating-current power source 101 to direct current rectified voltage $V_{REC}$ (111). A damping filter circuit 103 including inductor $L_{DM}$ (113), capacitor $C_{DM1}$ (123), capacitor $C_{DM2}$ (133) and resistor $R_{DM}$ (143) reduces electromagnetic interference from circuit 100. In the topology shown in FIG. 1, the "high" voltage for charging up capacitor $C_{VDD}$ (115) is applied from rectified voltage 111 to controller 105 (which may be an integrated circuit device) via resistor $R_{START}$ (121).

Figure 2:
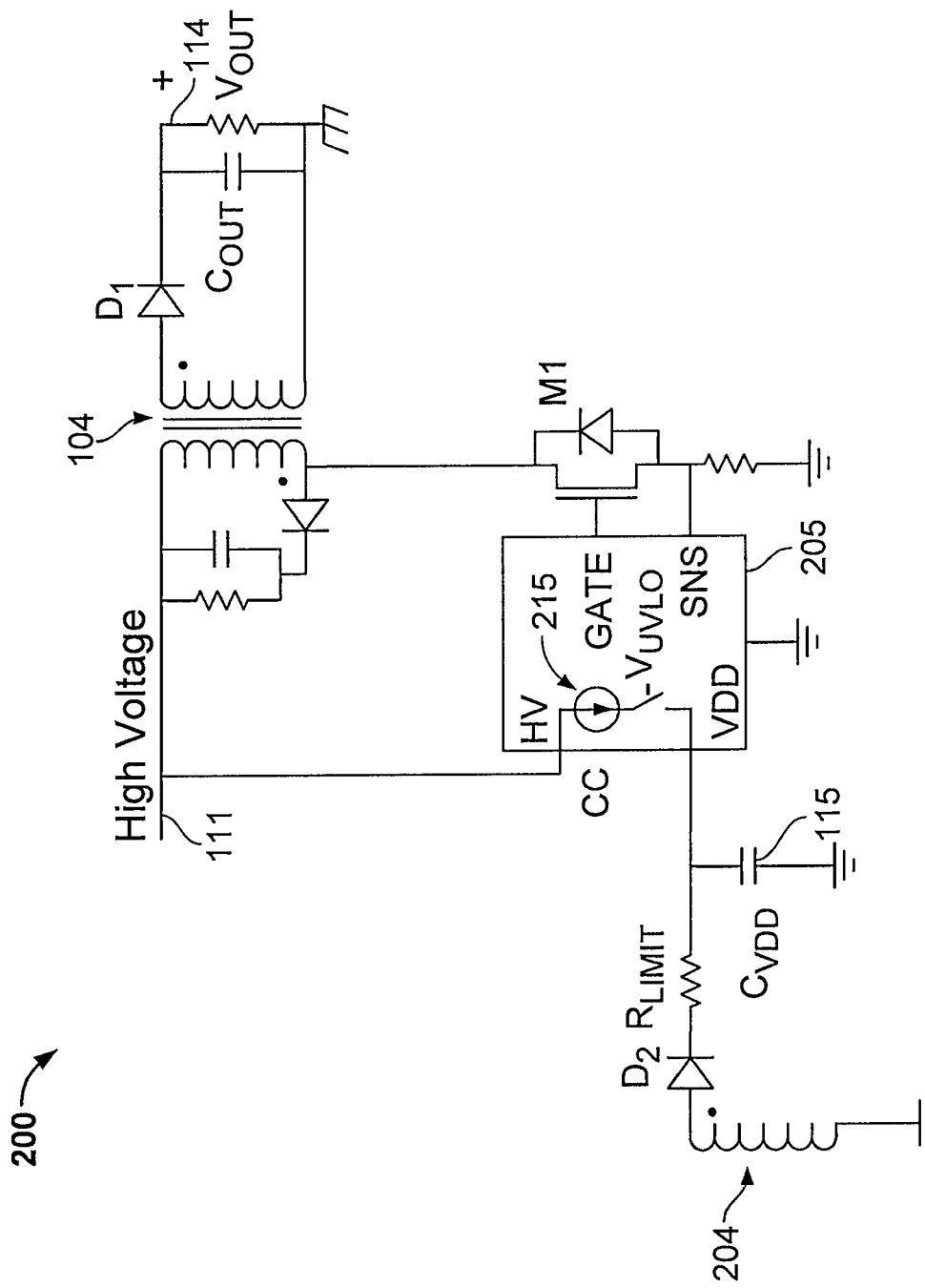
FIG. 2 shows a portion of an alternate switching mode power supply circuit used as an SSL controller.

The topology of FIG. 1 results in a constant power loss caused by the voltage drop across resistor $R_{START}$ (121). In the alternative 200 shown in relevant part in FIG. 2, resistor $R_{START}$ (121) may be eliminated, and rectified voltage 111 is applied directly to controller 205 (which may be an integrated circuit device). An internal switch 215, which may be a junction gate field-effect transistor (JFET) or a laterally-diffused metal oxide semiconductor transistor (LDMOS), cuts off rectified voltage 111 once the $V_{DD}$ level reaches an predetermined under-voltage lockout (UVLO) level, after which the current in auxiliary winding 204 of transformer 104 charges capacitor $C_{VDD}$ (115) (although drawn separately from transformer 104, auxiliary winding 204 is in fact part of transformer 104). While this arrangement reduces power consumption, the arrangement requires relatively expensive high-voltage circuitry 215 in controller 205.

Figure 3:
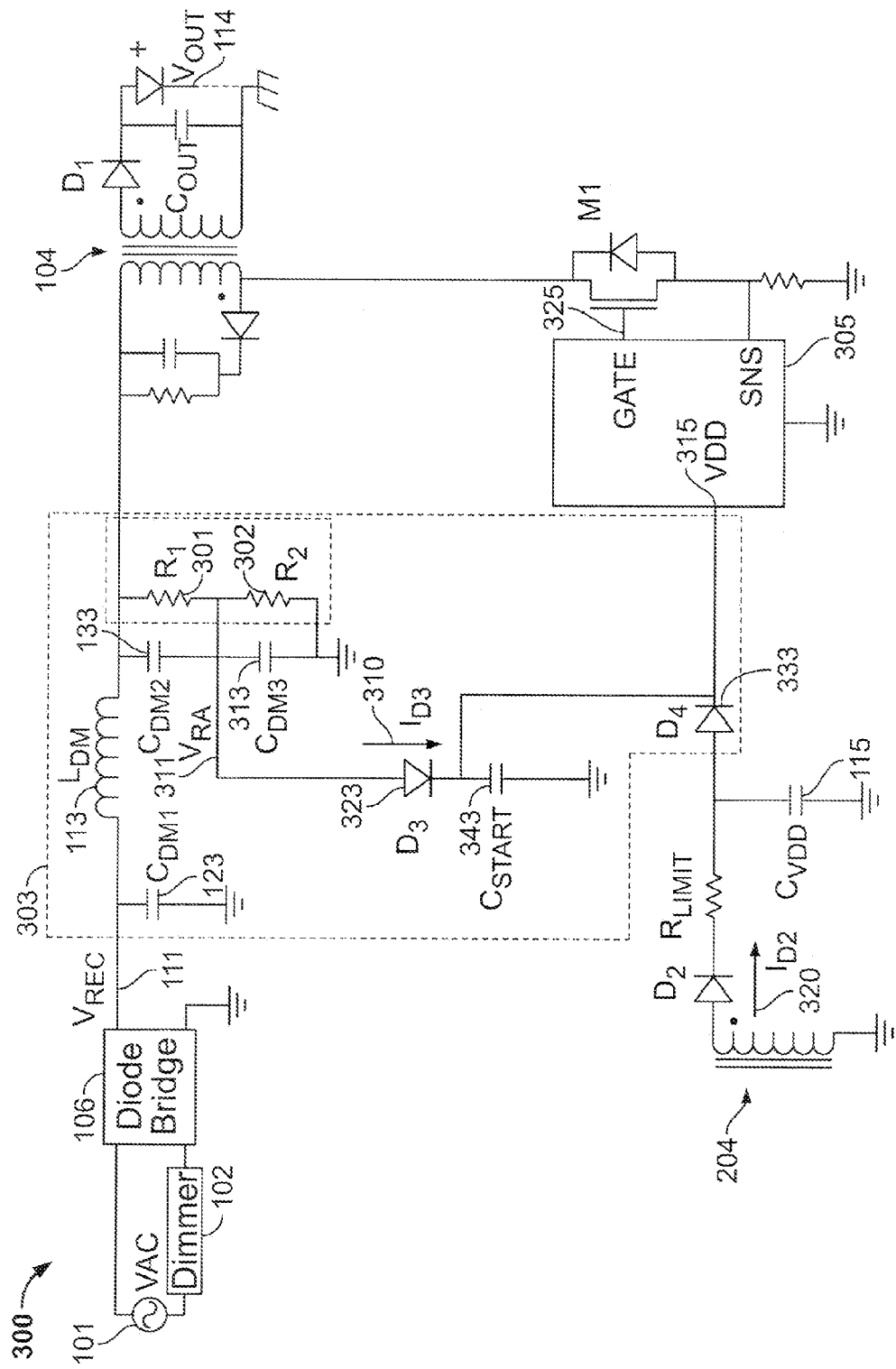
FIG. 3 shows a switching mode power supply circuit used as an SSL controller, according to an implementation of this disclosure.

FIG. 3 shows an implementation 300 of the current disclosure in which the damping filter circuit 103 is augmented, and the resonant characteristics of augmented damping filter circuit 303 provides the start-up voltage to controller 305 (which may be an integrated circuit device). In this topology, which may be used with any type of switching converter such as a fly-back converter or a buck-boost converter, resistor $R_{DM}$ (133) is eliminated, and a third capacitor $C_{DM3}$ (313) is added to form a voltage divider with capacitor $C_{DM2}$ (143), lowering rectified voltage 111 to divided voltage $V_{RA}$ (311). Optional resistors $R_1$ (301) and $R_2$ (302) may be provided in parallel with capacitor $C_{DM2}$ (143) and capacitor $C_{DM3}$ (313).

Additional diodes $D_3$ (323) and $D_4$ (333) along with additional capacitor $C_{START}$ (343) complete the augmented damping filter circuit 303. The resonant current $I_{D3}$ (310) of augmented damping filter circuit 303, which may be defined as: charges up capacitor $C_{START}$ (343) to provide biasing voltage $V_{DD}$ to controller 305. Voltage $V_{RA}$ (311) is chosen to be lower than the normal operating voltage on auxiliary winding 204. Therefore, once controller 305 has been triggered and voltage $V_{DD}$ is provided by current $I_{D2}$ (320) in auxiliary winding 204 charging capacitor $C_{VDD}$ (115), diodes $D_3$ (323) and $D_4$ (333) effectively disconnect augmented damping filter circuit 303 from the $V_{DD}$ startup input 315 of controller 305, so that augmented damping filter circuit 303 resumes the damping function described above in connection with damping filter circuit 103. When operating in this steady state in the damping mode, where resonant current $I_{D3}$ (310) is not flowing, there is little or no power consumption by augmented damping filter circuit 303.

Figure 4:
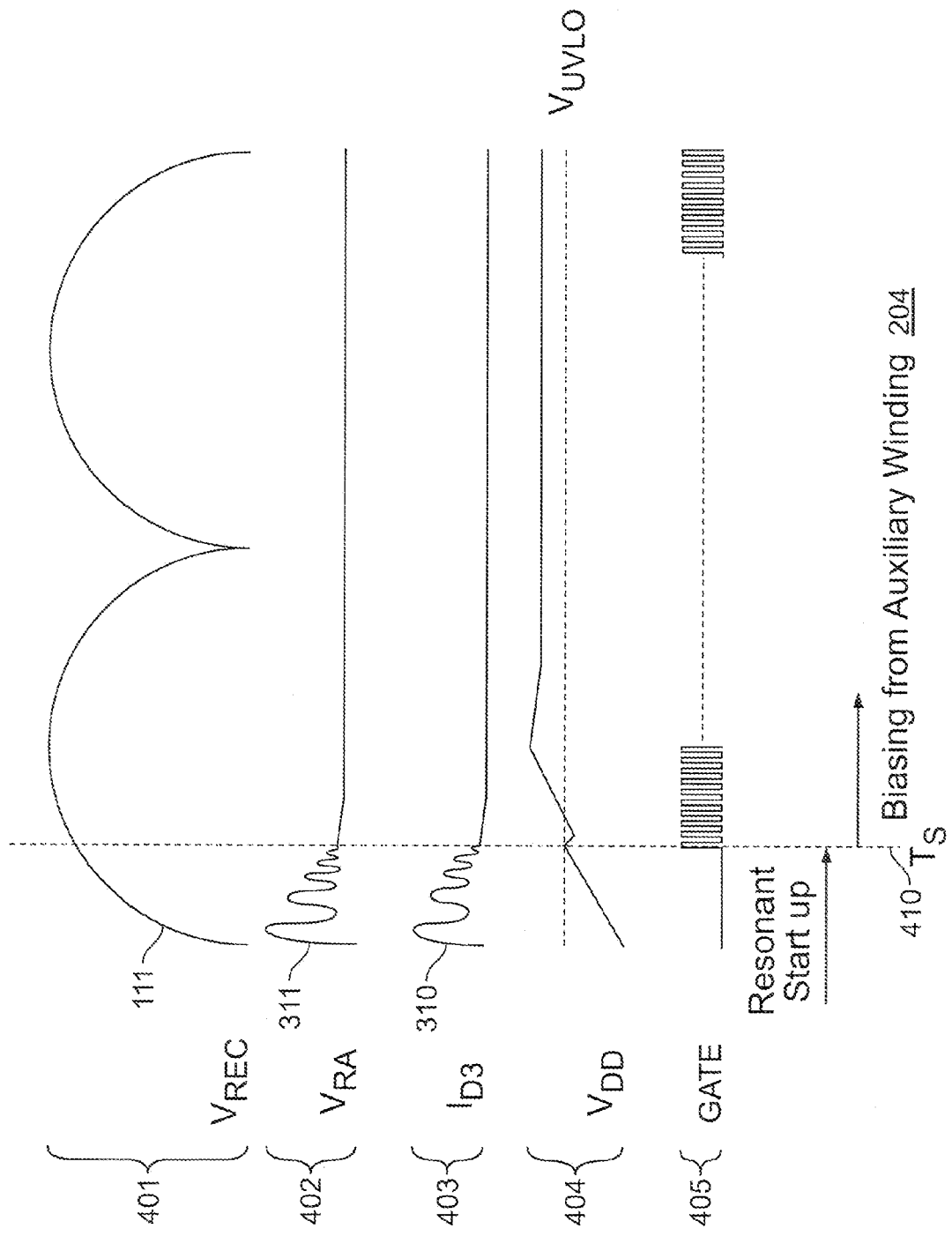
FIG. 4 illustrates the operation of the circuit of FIG. 3 with no dimmer

As noted above, dimmer 102 is optional. FIG. 4 shows the operation of implementation 300 with no dimmer. Voltage 401 is the rectified voltage $V_{REC}$ (111) output from diode bridge 106. Voltage 402 is the divided voltage $V_{RA}$ (311). Current 403 is the resonant current $I_{D3}$ (310). Voltage 404 is the biasing voltage $V_{DD}$. Voltage 405 is the driving output signal GATE (325) from controller 305. Time $T_s$ (410) is the time at which the start-up period ends and biasing voltage $V_{DD}$ is provided by current $I_{D2}$ in auxiliary winding 204 charging capacitor $C_{VDD}$ (115), which occurs when biasing voltage $V_{DD}$ reaches the undervoltage lockout voltage $V_{UVLO}$.

Figure 5:
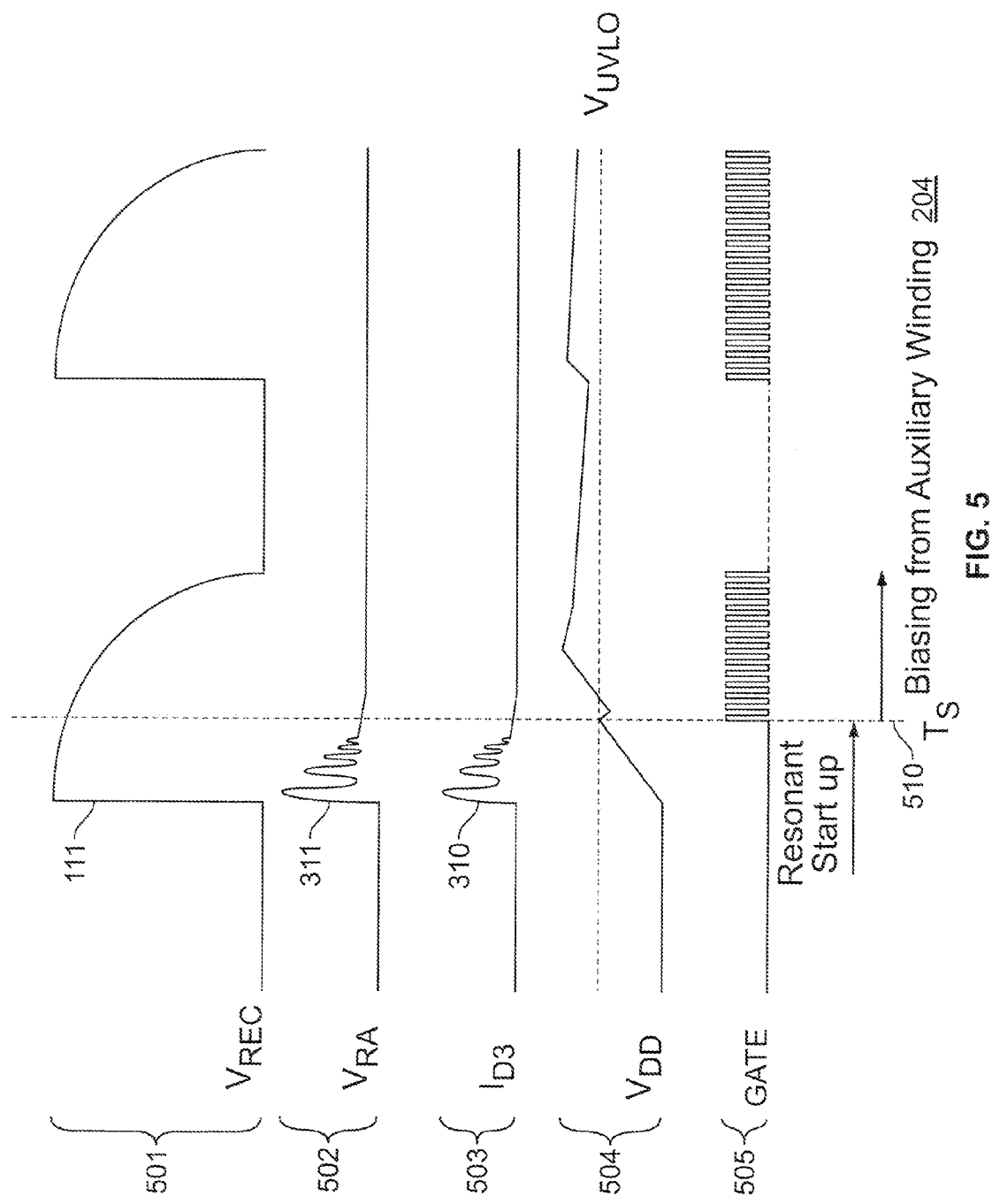
FIG. 5 illustrates the operation of the circuit of FIG. 3 with a dimmer.

FIG. 5 shows the operation of implementation 300 with a triac/thyristor dimmer. Voltage 501 is the rectified voltage $V_{REC}$ (111) output from diode bridge 106, as modified by the dimmer 102 at a triac conduction angle of 90°. Voltage 502 is the divided voltage $V_{RA}$ (311). Current 503 is the resonant current $I_{D3}$ (310). Voltage 504 is the biasing voltage $V_{DD}$. Voltage 505 is the driving output signal GATE (325) from controller 305. Time $T_s$ (510) is the time at which the start-up period ends and biasing voltage $V_{DD}$ is provided by current $I_{D2}$ (320) in auxiliary winding 204 charging capacitor $C_{VDD}$ (115), which occurs when biasing voltage $V_{DD}$ reaches the undervoltage lockout voltage $V_{UVLO}$.

As can be seen from a comparison of FIGS. 4 and 5, there is little difference between the operation of implementation 300 with a dimmer and the operation of implementation 300 without a dimmer.

Figure 6:
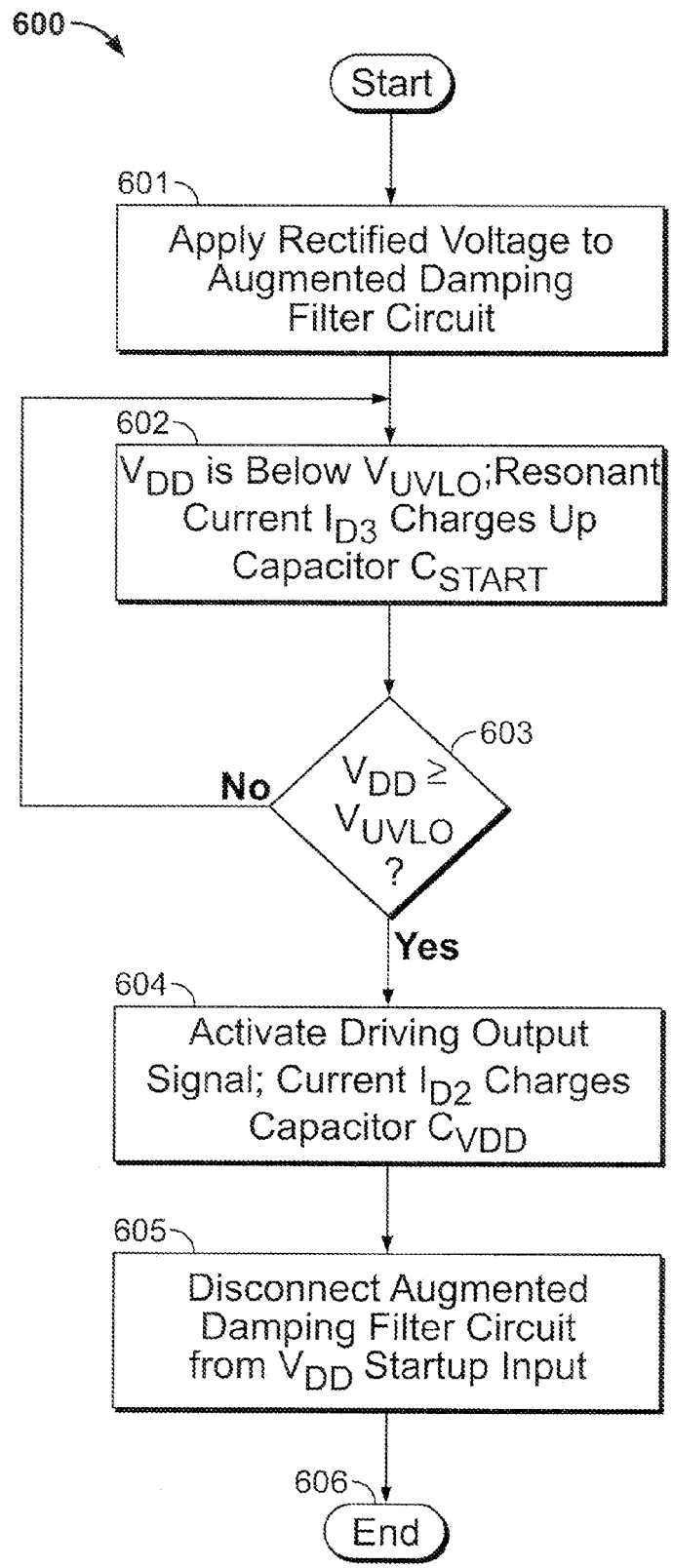
FIG. 6 is a flow diagram of a method according to an embodiment of the present disclosure.

A method 600 of operating a solid-state lighting controller in accordance with this disclosure is diagrammed in FIG. 6. Method 600 starts at 601 where rectified voltage (with or without a dimmer) is applied to augmented damping filter circuit 303. Because bias voltage $V_{DD}$ is still below $V_{UVLO}$, driving output signal GATE (325) is not active and current $I_{D2}$ is not flowing in auxiliary winding 204 to charge capacitor $C_{VDD}$ (115). Therefore, at 602, diodes $D_3$ (323) and $D_4$ (333) do not disconnect augmented damping filter circuit 303 from the $V_{DD}$ startup input 315 of controller 305, and resonant current $I_{D3}$ (310) charges up capacitor $C_{START}$ (343) to provide voltage $V_{DD}$ to controller 305.

At 603, controller 305 continually monitors whether $V_{DD}$ has reached $V_{UVLO}$. If not, method 600 loops back to 602. But if $V_{DD}$ has reached $V_{UVLO}$, then at 604, controller 305 activates driving output signal GATE (325), and, inter alia, current $I_{D2}$ begins flowing in auxiliary winding 204 to charge capacitor $C_{VDD}$ (115). Therefore, at 605, diodes $D_3$ (323) and $D_4$ (333) disconnect augmented damping filter circuit 303 from the $V_{DD}$ startup input 315 of controller 305. The start-up sequence is over, and method 600 ends until the system is switched off and back on, so that start-up method 600 begins again.

Thus, a start-up circuit and method for a solid-state lighting controller, which provides start-up biasing voltage to the controller without needing high-voltage components and with little or no power consumption under steady state operating conditions, are provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:
1. A controller, comprising:
a transformer;
a control circuit having a bias voltage input, the control circuit activating when voltage applied to the bias voltage input reaches a threshold, the transformer having feedback output to the bias voltage input;
a bias voltage circuit applying start-up bias voltage to the bias voltage input, the bias voltage circuit having:
a resonant circuit providing a resonant current,
a bias capacitor charged by the resonant current, wherein voltage on the bias capacitor is the start-up bias voltage applied to the bias voltage input, and
a cutoff, comprising at least one diode, to shut down the resonant current when the transformer feedback output is above the threshold; wherein:
the resonant circuit includes a voltage divider that divides a supply voltage to produce a divided voltage for the resonant current; and
the voltage divider is adjusted so that when the transformer feedback output is above the threshold, voltage on the transformer feedback output is above the divided voltage, thereby turning off the at least one diode.
2. The controller of claim 1 wherein the voltage divider includes a first voltage divider capacitor in series with a second voltage divider capacitor.

3. The controller of claim 2 wherein:
the voltage divider further includes a first voltage divider resistor in series with a second voltage divider resistor; and
the first and second voltage divider resistors are in parallel with the first and second voltage divider capacitors.

4. The controller of claim 1 wherein the at least one diode comprises a first diode between the voltage divider and the bias capacitor, the first diode having its forward direction from the voltage divider toward the bias capacitor.

5. The controller of claim 4 wherein the at least one diode further comprises a second diode between the transformer feedback output and the bias voltage input, the second diode having its forward direction from the transformer feedback output toward the bias voltage input.

6. The controller of claim 1 further comprising:
a dimmer circuit; wherein:
when the transformer feedback output is above the threshold, and the cutoff shuts down the resonant current in the resonant circuit, the resonant circuit functions as a damping circuit to dampen interference from the dimming circuit.

7. The controller of claim 6 wherein the dimmer circuit comprises a triac.

8. The controller of claim 6 wherein the dimmer circuit comprises a thyristor.

9. The controller of claim 1 further comprising:
a supply of alternating current; and
a rectifier that rectifies the alternating current and supplies rectified current to the resonant circuit.

10. The controller of claim 9 wherein the rectifier comprises a diode bridge.

11. The controller of claim 1 wherein the controller is a controller for solid-state lighting.

12. A method of operating a controller, the controller including a transformer, and a control circuit having a bias voltage input, the control circuit activating when voltage applied to the bias voltage input reaches a threshold, the transformer having feedback output to the bias voltage input; the method comprising:
applying start-up bias voltage to the bias voltage input, by providing a resonant current to charge a start-up bias capacitor, wherein voltage on the start-up bias capacitor is applied to the bias voltage input as the start-up bias voltage; and
automatically cutting off the resonant current, using at least one diode, when the transformer feedback output is above the threshold; wherein:
the providing the resonant current includes a dividing a supply voltage to produce a divided voltage for the resonant current; and
the dividing the supply voltage is adjusted so that when the transformer feedback output is above the threshold, voltage on the transformer feedback output is above the divided voltage, thereby turning off the at least one diode.

13. The method of claim 12, wherein:
the applying is performed using a resonant circuit; and
when the transformer feedback output is above the threshold, and the resonant current is shut off, the resonant circuit is used as a damping circuit.

14. The method of claim 12 wherein the method is for controlling solid-state lighting.

15. A method of operating a solid-state lighting controller, the solid-state lighting controller including a transformer, and a control circuit having a bias voltage input, the transformer having feedback output to the bias voltage input; the method comprising:
applying start-up bias voltage to the bias voltage input, by providing a start-up current to charge a start-up bias capacitor, wherein voltage on the start-up bias capacitor is applied to the bias voltage input as the start-up bias voltage;
monitoring, by the solid state lighting controller, voltage at the bias voltage input;
activating, by the solid state lighting controller, of a driving signal when the voltage at the bias voltage input reaches a threshold, whereby current flows in the transformer, including in the transformer feedback output, to charge an operating mode bias capacitor, thereby generating an operating mode bias voltage; and
discontinuing the start-up current, using at least one diode, when the operating mode bias voltage reaches the threshold; wherein:
the providing the start-up current includes a dividing a supply voltage to produce a divided voltage for the start-up current; and
the dividing the supply voltage is adjusted so that when the transformer feedback output is above the threshold, voltage on the transformer feedback output is above the divided voltage, thereby turning off the at least one diode.

16. The method of claim 15, wherein:
the applying is performed using a resonant circuit; and
after the discontinuing, the resonant circuit is used as a damping circuit.

17. The method of claim 16 wherein the applying comprises providing a rectified alternating current.

* * * * *